United States Patent

Heiberger

[15] 3,694,923
[45] Oct. 3, 1972

[54] RACK INSPECTION APPARATUS

[72] Inventor: Francis E. Heiberger, Elmhurst, Ill.

[73] Assignee: Danly Machine Corporation

[22] Filed: Feb. 27, 1970

[21] Appl. No.: 15,163

[52] U.S. Cl. .......33/179.5 B, 33/179.5 C, 33/179.5 E
[51] Int. Cl. .......G01b 7/28, G01b 7/30, G01b 19/28
[58] Field of Search....33/179.5 R, 179.5 C, 179.5 E, 33/179.5 A, 179.5 B; 73/162

[56] References Cited

UNITED STATES PATENTS

| 2,350,788 | 6/1944 | Martin | 33/179.5 B |
| 2,687,576 | 8/1954 | Mahr | 33/179.5 C |
| 2,855,691 | 10/1958 | Cunningham | 33/179.5 C |

Primary Examiner—Leonard Forman
Assistant Examiner—Paul G. Foldes
Attorney—Wolfe, Hubbard, Leydig, Voit & Osann, Ltd.

[57] ABSTRACT

For quality control inspection of a rack-type gear to check for deviations of the rack from specified pitch and gauge, the rack is advanced a measured distance in meshing engagement with a pivotally mounted ultra precision pinion gear cut to the specified pitch. The resultant rotation of the pinion is converted by an encoder to a digital count which, in turn, is compared against the measured distance through which the rack was moved to determine the accuracy or lack of accuracy of the pitch of the rack. A detector senses any pivotal movement of the pinion as the rack is advanced to sense differences in the gauge of the rack along its length.

5 Claims, 7 Drawing Figures

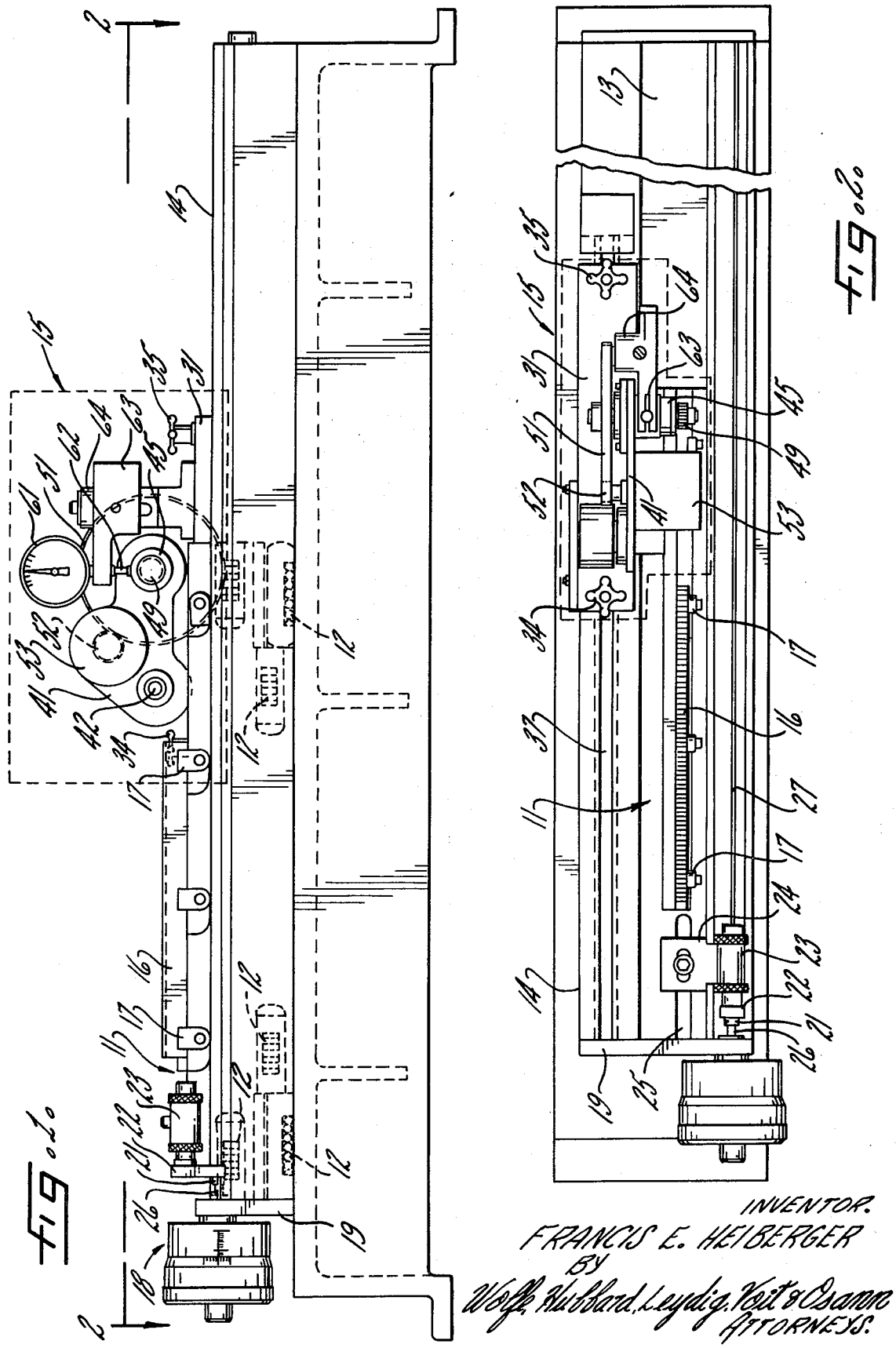

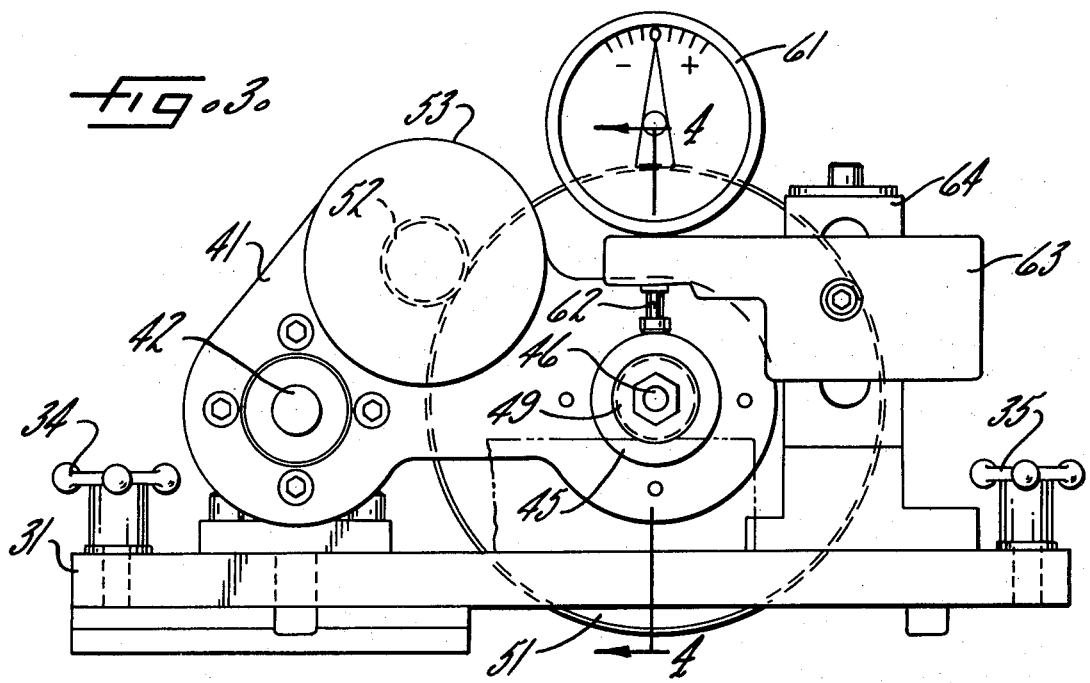
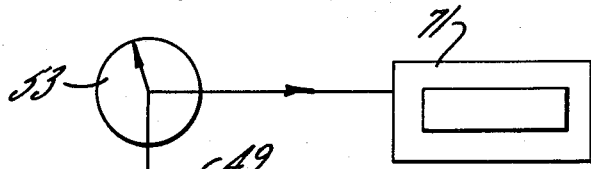
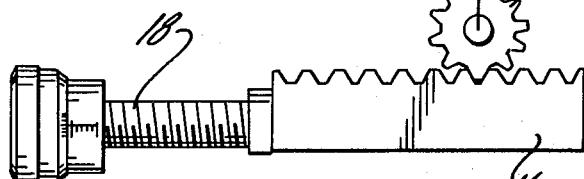
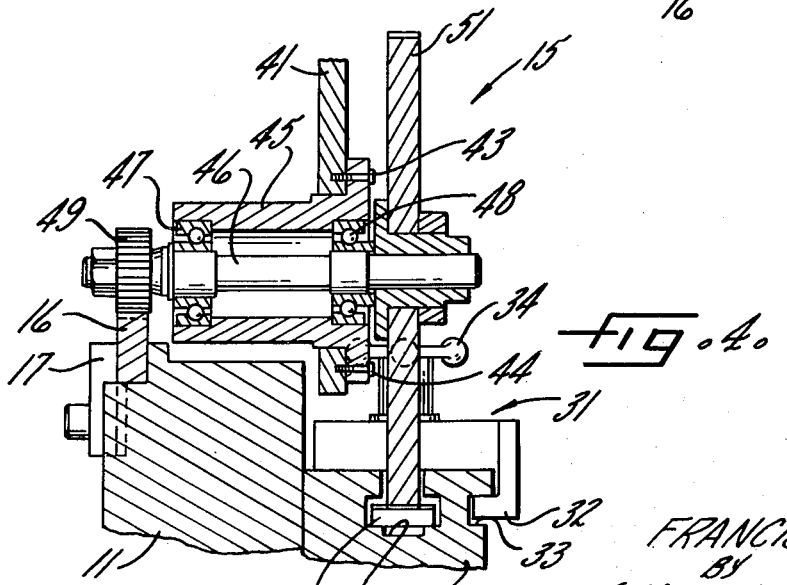
INVENTOR.
FRANCIS E. HEIBERGER

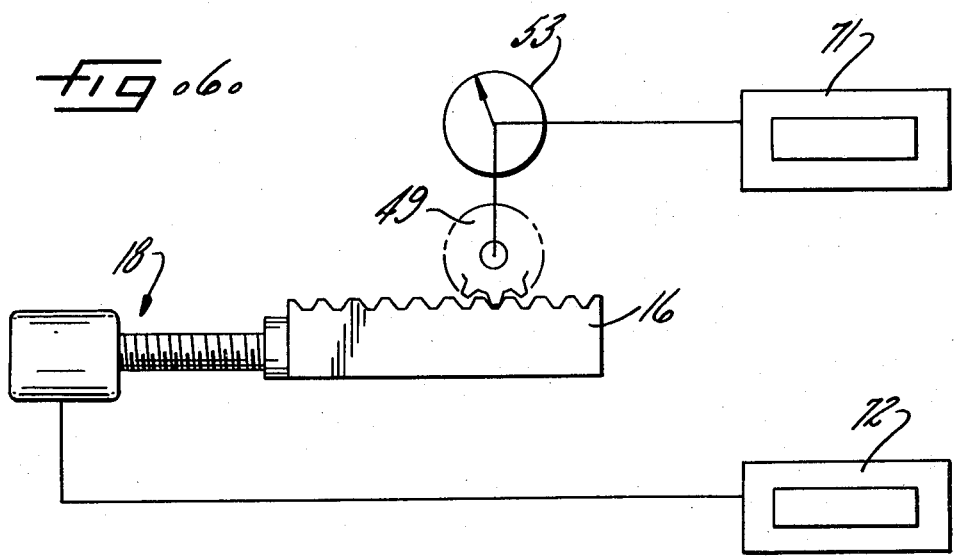
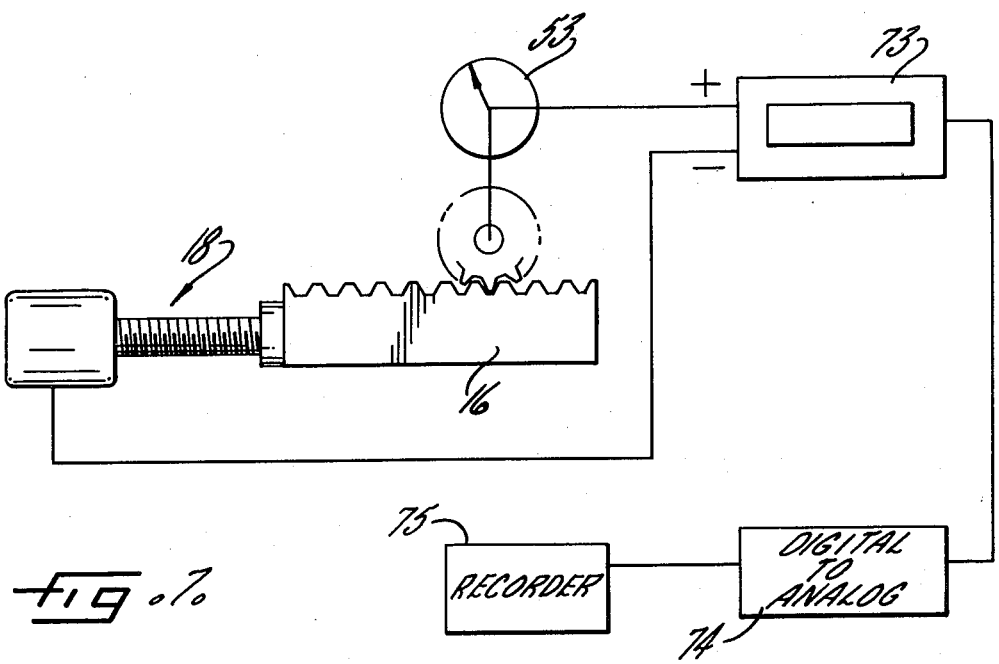

RACK INSPECTION APPARATUS

BACKGROUND OF THE INVENTION

The present invention relates to quality control methods and apparatus, and more particularly to quality control methods and apparatus for inspecting rack-type gears.

The rack and pinion is one of the oldest mechanisms for converting rotary motion to linear motion, and vice-versa. But, the recent development of precision equipment using racks and pinions, such as to provide positioning feedback in numerically controlled machine tools, has created a demand for precision racks and pinions, manufactured to very exacting pitch specifications, which allow only very slight tolerance deviations. This, in turn, has created a demand for suitable quality control methods and apparatus for determining whether or not the exacting specifications have been satisfied.

SUMMARY OF THE INVENTION

The general aim of the present invention is to provide improved methods and apparatus for quality control inspection of the pitch of rack gears, including those that must satisfy exacting specifications. A more detailed object is to provide methods and apparatus for performing such a quality control inspection directly and without any comparison of the rack being inspected with a known standard.

Another object of this invention is to provide quality control methods and apparatus which may be used by even relatively unskilled labor for inspecting the pitch of even precision rack gears. A related object is to provide rack gear pitch inspecting apparatus which supplies a readily understandable and interpretable readout indicating the accuracy or lack of accuracy of the pitch of the rack gear being inspected.

Still another object of the present invention is to provide rack gear pitch checking apparatus which may be used to check the pitch of any given segment of a rack gear, as well as the overall average pitch of a variety of rack gears of different lengths.

A further object of the present invention is to supply a combined rack gear pitch and gauge checking apparatus for performing a substantially complete quality control inspection thereof in a single pass.

Finally, it is an object of this invention to provide relatively simple and economical methods and apparatus for rapid but accurate quality control inspection of rack gears.

BRIEF DESCRIPTION OF THE DRAWINGS

Other objects and advantages of the present invention will become apparent as the following detailed description of the illustrated embodiments in conjunction with the attached drawings, in which:

FIG. 1 is a side elevation of a combined rack gear pitch and gauge checking instrument constructed in accordance with the present invention;

FIG. 2 is a top plan view of the instrument, looking along the line 2—2 in FIG. 1;

FIG. 3 is an enlarged side elevation of the encoder section of the instrument of FIG. 1;

FIG. 4 is a vertical section taken through the encoder section, looking along the line 4—4 in FIG. 3;

FIG. 5 is a simplified schematic diagram indicating one method of checking the accuracy of the pitch of the rack gear being inspected by comparing the readout of a rack driven encoder with the reading on a rack driving micrometer;

FIG. 6 is another simplified schematic diagram indicating a more sophisticated and accurate method of checking the pitch of the rack being inspected; and FIG. 7 is still another schematic diagram indicating an even more sophisticated method of checking the pitch of the rack being inspected.

DETAILED DESCRIPTION OF THE ILLUSTRATED EMBODIMENT

While the invention is described herein in connection with a single basic embodiment and a number of suggested refinements, it is to be understood that the intent is not to so limit it. To the contrary, the intent is to cover all alternatives, modifications and equivalents as may come within the spirit and scope of the present invention.

Turning now to the drawings, and particularly to FIGS. 1 and 2, the rack gear inspecting apparatus there shown includes a carriage 11, which is supported by roller bearings 12 within a channel 13 in a table 14, and an encoder assembly 15, which is mounted on the table 14 to the rear of the channel 13. The rack 16 to be inspected is secured on the carriage 11 by a number of spaced clamps 17 and advanced with the carriage 11 through the operation of a micrometer 18.

In the illustrated embodiment, the micrometer 18 is supported by a bracket 19 and offset forwardly of the carriage 11 along the front edge of the table 14. The micrometer 18 is effective to precisely control the advance of the carriage 11, since its anvil 24 is engaged with the lower end of a pusher bar 22 which, in turn, is fixed at its upper end, through a thumb screw-type clamp 23 and a clamped plate 24, to the carriage 11. For initial positioning of the carriage 11, usually when the micrometer is in its zero or fully retracted position, the position of the plate 24 on the carriage 11 may advantageously be adjustable over a limited range, such as along the length of a slot 25 provided in the carriage 11.

As will be appreciated, the length of the rack gear 16 may be many times the length to which the spindle 26 of any ordinary micrometer can be extended. For this reason, as here shown, the table 14 has a notch 27 or the like in alignment with the anvil 21 of the micrometer 18 to accommodate and hold in position, between the anvil 21 and the lower end of the pusher bar 22, one or more slugs or blanks (not shown) of predetermined length. In this way, to provide any total advance of the carriage 11 that is required for inspection of the rack gear 14, the micrometer spindle 26 can be retracted after each incremental advance of the carriage, a slug with a length equal to the incremental advance inserted, and the cycle repeated as often as necessary.

Turning now to the encoder assembly 15, and referring to FIGS. 1–4, it will be seen that it is carried on a base 31 which is slidably mounted on the table 14, so that the position of the encoder assembly can be adjusted along the length of any given rack 16 as well as for inspection of racks of a variety of different lengths. The base 31 is held against forward movement toward the channel 13 by a tongue 32 which fits into a groove 33 that is provided in the rear side of the table 14. Once the position of the encoder assembly 15 is properly adjusted relative to the rack 16, the base 14 is clamped against further movement through the operation of hand wheels 34 and 35, which tighten respective clamps (one of which can be partially seen at 36 in FIG. 4) in an undercut groove 37 formed in the upper surface of the table 14.

The encoder assembly 15 includes a bracket 41 which is pivotally mounted at 42 on the base 31, and pinned to the bracket 41, at 43 and 44, there is a collar 45 which supports a horizontal shaft 46 through bearings 47 and 48. The forward end of the shaft 46 extends outwardly over the channel 13, and a master pinion gear 49 is retained at the outer end thereof in vertical alignment with the rack 16. Thus, to inspect the rack 16, the position of the encoder assembly 15 is adjusted to bring the master pinion 49 into mesh with the rack 16 at the desired starting point for the inspection run, typically at the right-hand end of the rack.

The master pinion 49 is an ultra precision quality gear (i.e., a gear with a tooth-to-tooth pitch accuracy of within 0.00015 inches) and is selected to have a pitch equal to the nominal or desired pitch of the rack 16. Accordingly, as the rack 16 is advanced through a determinable distance, the resultant rotation of the master pinion 49 is a very precise measurement of the pitch accuracy of the rack.

To provide a readily understandable and interpretable readout, the rotation of the master pinion 49 is converted to a digital count. To this end, there is a drive gear 51 retained on the rearward or inner end of the shaft 46 in meshing engagement with the input pinion 52 of a digital encoder 53. The digital encoder 53 and its input pinion 52 are supported by the same bracket 41 as the master pinion 49 and drive gear 51, so that the mesh of the gears is not disturbed even by a change in the gauge of the rack 16 being inspected.

As will be appreciated, the degree of correlation between the count provided by the encoder 53 and the actual pitch accuracy of the rack 16 depends on the encoder resolution available and the pitch accuracy of the master pinion 49, the drive gear 51 and the encoder pinion 52. However, if available ultra precision gears and an available precision encoder are used, a resolution of rack gear inaccuracies down to about 0.0001 inch can be expected.

It will of course be understood that the count supplied by the encoder 53 may be compared in a number of different ways against the distance traveled by the rack 16 undergoing inspection to determine the accuracy or lack of accuracy of the rack pitch. For example, as shown in FIG. 5, the encoder count may be directly displayed by a digital counter 71 to provide a count that the operator can compare against the travel of the rack 16, as indicated by a reading on the micrometer 18. Given the nominal encoder count/inch of rack travel for the particular rack 16 under inspection, the operator can then readily calculate its pitch accuracy. Alternative, as shown in FIG. 6, the micrometer 18 may be equipped with a digital encoder (not shown) to supply a count displayed on a second digital counter 72, which may then be compared by the operator against the count shown on the counter 71 to determine the pitch accuracy of the rack 16. Finally, as shown in FIG. 7, the count supplied by the micrometer operated encoder (not shown) may be subtracted from the count supplied by the master pinion operated encoder 53 in an add-subtract or differential type digital counter 73, and the resulting error count may be directly displayed for interpretation by the operator. Moreover, the error count may be fed through a digital to analog converter 74 to a recorder 75 or the like to provide a record of the results of the inspection.

Returning to FIGS. 1–4, in keeping with another feature of the present invention, provision is made to check the rack 16 for gauge (i.e., average thickness per unit length deviations at the same time as it is inspected for pitch accuracy. For this purpose in the illustrated embodiment a plunger-actuated null-type detector 61 is shown as being supported with its plunger 62 spring biased against the collar 45 to ride up and down therewith as gauge changes occur. More specifically, the detector 61 is shown as being supported by a bracket 63 which is cantilevered from and vertically adjustable on a vertical post 64 which, in turn, is fixed to the base 31 of the encoder assembly 15. The vertical adjustability of the bracket 63 enables the detector 61 to be nulled for a number of racks of different nominal or desired gauges.

From the foregoing, it will be appreciated that the rack gear inspecting method and apparatus provided by the present invention enable an exacting quality control inspection to be made of a wide variety of rack gears of different lengths, gauges and pitches. It will also be appreciated that the inspection may be made relatively quickly and that no particular degree of operator skill is required.

I claim as my invention:

1. A quality control instrument for inspecting a rack gear for deviations from a specified pitch comprising the combination of a table, a carriage for said rack gear mounted on said table, a drive mechanism for linearly advancing said carriage along a path provided on said table, means associated with said drive mechanism for measuring the amount of the advance of said carriage, a rotatably mounted pinion gear having said specified pitch, a pivotally mounted bracket for supporting said pinion above said carriage for meshing engagement thereof with said rack, a digital encoder, coupling means between said pinion and said encoder for activating said encoder in response to any rotation of said pinion to supply a count representative of said rotation, and a counter coupled to said encoder for registering the count supplied thereby.

2. The quality control instrument of claim 1 wherein said encoder and said coupling means are supported by the same bracket as said pinion for movement therewith in response to any change in the gauge of said rack gear.

3. The quality control instrument of claim 2 wherein said coupling means includes a shaft supported by said bracket and fixed at one end to said pinion, a drive gear fixed to said shaft at its other end, and an input pinion for said encoder supported by said bracket in meshing engagement with said drive gear.

4. The quality control instrument of claim 1 further including detector means mounted on said table and responsive to pivotal movement of said bracket for sensing any change in gauge of said rack gear.

5. The quality control instrument of claim 1 wherein said bracket has a member fixed thereto and extending therefrom; and wherein said detector means includes a plunger biased against said member for movement toward and away from said table therewith, and a display operated in response to any such movement of said plunger.

* * * * *